(12) United States Patent  
Nadgouda et al.

(10) Patent No.: US 8,215,712 B2  
(45) Date of Patent: Jul. 10, 2012

(54) SEAT RECLINER ASSEMBLY

(75) Inventors: Prasad Nadgouda, Maharashtra (IN); Vikram Nanagiri, Maharashtra (IN); Ashok Ramteke, Maharashtra (IN)

(73) Assignee: Hema Engineering Industries Limited, Pune, Maharashtra (IN)

( * ) Notice: Subject to any disclaimer, the term of this patent is extended or adjusted under 35 U.S.C. 154(b) by 263 days.

(21) Appl. No.: 12/629,949

(22) Filed: Dec. 3, 2009

(65) Prior Publication Data

US 2010/0141006 A1   Jun. 10, 2010

(30) Foreign Application Priority Data

Dec. 4, 2008  (IN) .......................... 2536/MUM/2008

(51) Int. Cl.  
*B60N 2/235* (2006.01)

(52) U.S. Cl. ..................................... 297/367 R; 297/366
(58) Field of Classification Search ................. 297/366, 297/367, 369  
See application file for complete search history.

(56) References Cited

U.S. PATENT DOCUMENTS

| | | | |
|---|---|---|---|
| 6,474,740 B1 * | 11/2002 | Kondo et al. | 297/367 R |
| 6,786,550 B2 * | 9/2004 | Uramichi | 297/366 |
| 7,703,852 B2 * | 4/2010 | Wahls et al. | 297/367 R |

* cited by examiner

*Primary Examiner* — Sarah B McPartlin  
(74) *Attorney, Agent, or Firm* — Ladas & Parry LLP

(57) ABSTRACT

A compact and robust seat recliner assembly includes a seat recliner assembly with a guide plate, a pivotable plate, four pawls, a shaft, a cam, a retractor plate and a pre-tensioned spring wherein the pawls engage with the pivotable plate to lock the seat back from moving and the four pawls share the load on the assembly.

5 Claims, 9 Drawing Sheets

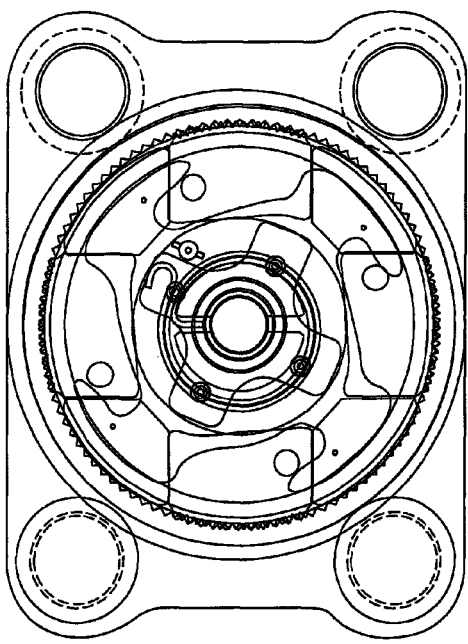 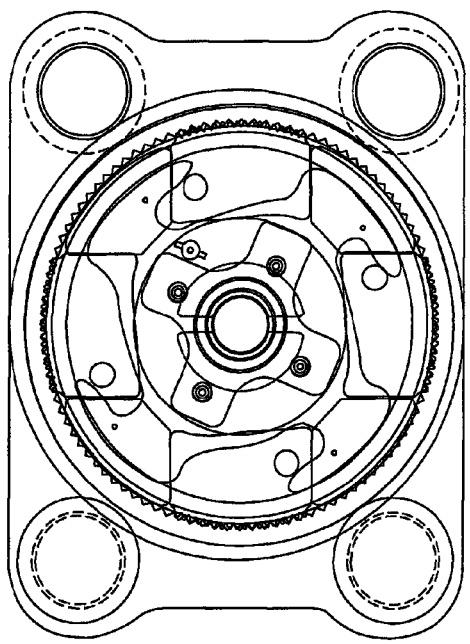
FIG. 12　　　　　　　　FIG. 13
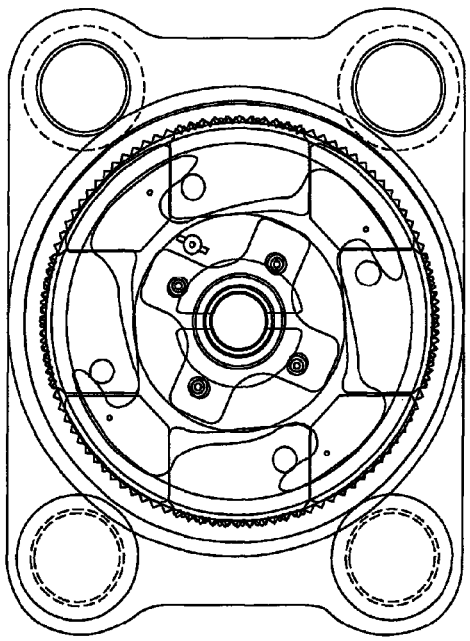
FIG. 14

SEAT RECLINER ASSEMBLY

TECHNICAL FIELD

The present invention relates to a seat recliner assembly. More particularly, the invention relates to a seat recliner assembly, attached to a seat having a seat cushion and a seat back pivotally mounted on the seat cushion, for adjusting the seat back position relative to the seat cushion. The recliner assembly may be used in vehicle seats as well as seats or reclining structures of any kind.

BACKGROUND

The prior art describes various kinds of reclining seat assemblies. One of the patent number U.S. Pat. No. 6,328,382 describes a locking structure for a reclining seat capable of locking the seat back position without looseness and preventing the "biased action" of the pair of pawls. This invention has been titled as "Locking structure for a reclining seat". Another U.S. Pat. No. 4,146,267 titled as "Adjusting device for reclining seat" relates to reclining seats for automotive vehicles and more particularly, to an adjusting device for the reclining seat which can be operated either at the front seat or at the rear seat.

Presently, several seat recliner assemblies for a reclining seat are in existence. Many of these are large in size and difficult to accommodate in seat structure in case of space constraints. Now, the need has aroused to develop a compact, robust and cost effective seat recliner assembly, which can be fitted in variety of seat structures.

The present invention provides a seat recliner assembly with a guide plate, a pivotable plate, four pawls, a shaft, a cam, a retractor plate and a pre-tensioned spring wherein the pawls engage with the pivotable plate to lock the seat back from moving and the four pawls share the load on the assembly.

SUMMARY OF THE INVENTION

According to an embodiment of the invention, a seat recliner assembly is provided which comprises: an embossed pivotable plate placed on one end of the assembly and fixed to back frame of a seat, said pivotable plate comprising: a first circular section having a circumference with v-shaped teeth, and a first circular hole at center of said circular portion; an embossed guide plate placed on other end of the assembly and fixed to lower frame of the seat, said guide plate comprising: a second circular section having four guides, a second circular hole at center of said circular portion, and a first hook surrounding said hole; four pawls secured to said guide plate by sliding in said four guides, each pawl comprising: two side surfaces for sliding in said guides, a third side surface with v-shaped teeth for engaging with said first circular section when the seat is in a locked position, a fourth side surface opposite to the third side surface having a tapered end, and a projection; a shaft passing through the holes of said guide plate and said pivotable plate to provide a center axis to the assembly, comprising: a first step, a second step adjoining the first step, wherein the pivotable plate is mounted on the shaft portion adjoining the second step and the guide plate is mounted on the shaft portion adjoining the first step; a cam fitted on said first step, said cam comprising: a circular hole at its center, and four lobes, each provided with a circular hole and each being in contact with the fourth side surface of each pawl to push the pawl for engaging with said first circular section when the seat is in a locked position; a retractor plate mounted on said second step, comprising: a circular hole at its center, a second hook, four projections for fixing in said holes of said lobes and securing the plate with the cam, four arms capable of engaging with the projection of each of said pawls and pulling the pawls towards the center of the first plate to disengage them from the said first circular portion; a pre-tensioned spring secured to said first hook and said second hook; wherein by applying torque to the shaft, the cam rotates towards the tapered end of the pawls to release pressure from the pawls, the pawls thereby slide down towards the center axis of said assembly along the guides, the retractor plate rotates and the arms of said retractor plate engage with the projections of said pawls to further pull down the pawls towards the center axis of said assembly and disengage the pawls from the first plate, thereby allowing movement of the seat back.

According to another embodiment of the invention, a suitable friction angle is maintained between the fourth side surface of each of said pawls and each lobe of the cam.

According to another embodiment of the invention, the pivotable plate and the guide plate are fixed to the said back frame and said lower frame respectively with rivets.

According to another embodiment of the invention, a lever is attached to one end of the shaft for applying torque to the shaft.

The above described embodiments of seat recliner assembly allow the occupant to adjust the position of the seat back as per his/her comfort in fine increments.

According to yet another embodiment of the invention, a seat is provided with a pair of the seat recliner assemblies secured on both sides of the seat and joined by a torsion rod.

The provision of the assemblies on both sides provides robustness to the seat structure and gives the extra stiffness to the complete seat structure under frontal or rear impact conditions. Under impact condition, it sustains heavy shock and keeps the seat structure intact and the occupant safe.

BRIEF DESCRIPTION OF DRAWINGS

FIG. 12 illustrates just release position when pawls are about to drop due to its own weight.

FIG. 13 illustrates just release position when pawls do not drop due to its own weight.

FIG. 14 illustrates release position when pawls are pulled down by retractor plate.

Figure 1:
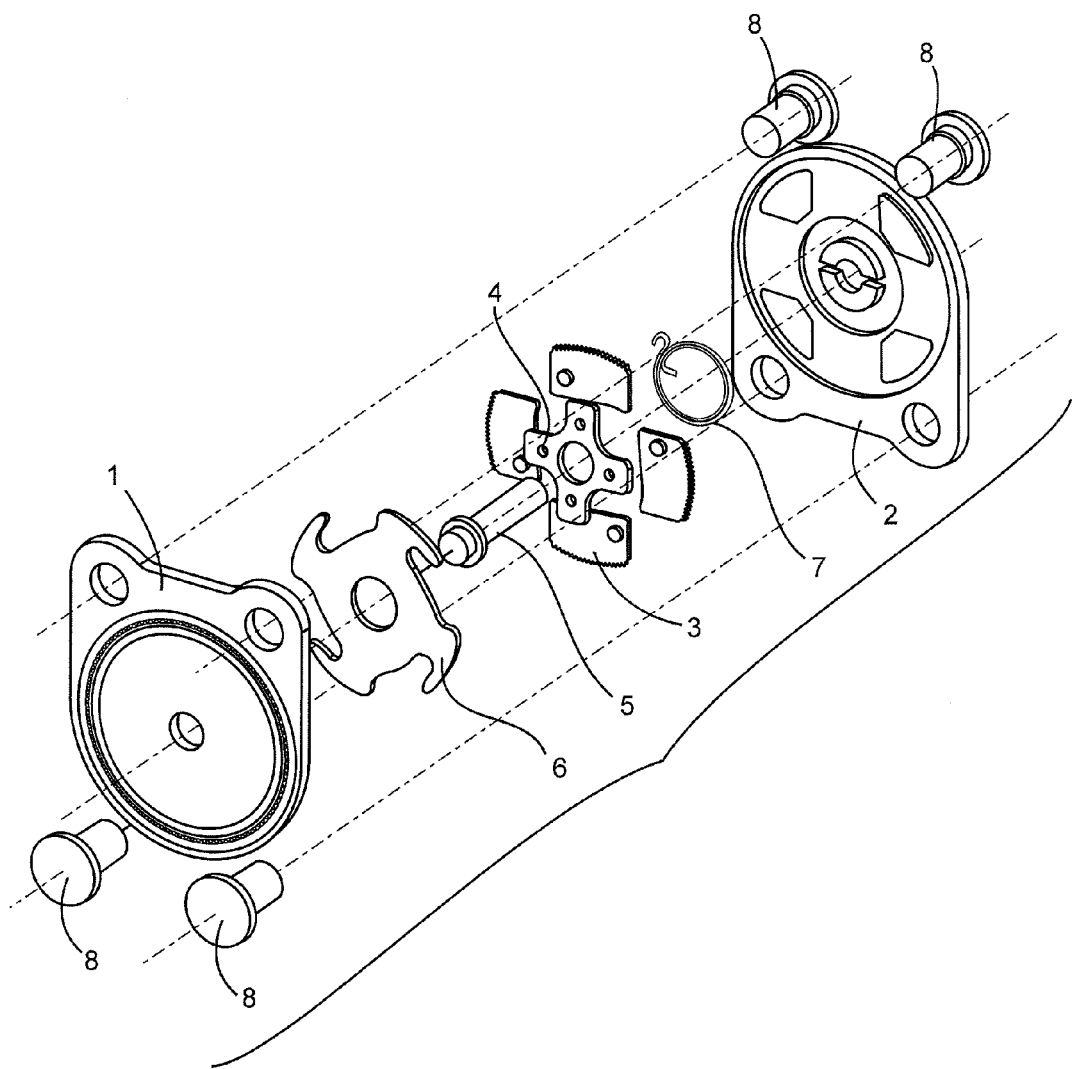
FIG. 1 illustrates an embodiment of the present invention depicting the exploded view of the assembly.

| Description of Elements | Reference numeral |
| --- | --- |
| Pivotable plate | 1 |
| Guide plate | 2 |
| Pawls | 3 |
| Cam | 4 |
| Shaft | 5 |
| Retractor plate | 6 |
| Spring | 7 |
| Rivets | 8 |
| First circular section | 10 |
| Holes for rivets | 11 |
| First circular hole | 12 |
| Second circular section | 14 |
| Holes for rivets | 15 |
| Four guides | 16 |
| Second circular hole | 18 |
| First hook | 20 |
| Two side surfaces | 22 |
| Third side surface | 24 |
| Projection of Pawl | 25 |
| Fourth side surface | 26 |
| Tapered end | 27 |
| First step of shaft | 28 |
| Shaft portion adjoining the second step | 29 |
| Second step of shaft | 30 |
| Shaft portion adjoining the first step | 31 |
| End of the shaft where lever is attached | 33 |
| Circular hole of Cam | 32 |
| Four lobes of the cam | 34 |
| Circular hole of lobe | 35 |
| Circular hole of retractor plate | 36 |
| Second hook | 38 |
| Four projections | 40 |
| Four arms of retractor plate | 42 |

DETAILED DESCRIPTION OF THE INVENTION

The present invention can be more fully understood by reading the following detailed description of some of the embodiments, with reference made to the accompanying drawings.

FIG. 1 illustrates an exploded view of the assembly according to an embodiment of the present invention. Pivotable plate 1 as shown in the assembly is an embossed pivotable plate placed on one side of the assembly and attached to the back frame of the seat structure with the help of rivets 8. A first circular hole 12 is provided on the pivotable plate 1 which helps for angular movement in forward and rearward direction. A first circular section 10 of the pivotable plate has V-shaped teeth on its internal circumference. On the other side of the assembly, there is an embossed guide plate 2 fixed to the lower frame of the seat. The guide plate 2 is matable with the pivotable plate 1 when all the parts are fitted together. The guide plate 2 comprises a second circular section 14 which has four guides 16. A second circular hole 18 is provided at the center of the second circular portion with a hook 20 surrounding the hole 18. The seat recliner assembly comprises of four pawls 3, each having four side surfaces, with V-shaped teeth on the external diameter of one side surface. The pawls 3 slide into the guides of the guide plate 2 and the V-shaped teeth engage with the first circular section 10 when the seat is in a locked position. The pawls 3 being four in number help to reduce the size of the assembly. Under conditions of impact all four pawls 3 share the entire load of the said assembly.

Cam 4 having four lobes 34 is positioned between the pivotable plate 1 and the guide plate 2 and is in contact with the pawls 3 at four locations. The profile of Cam 4 is designed in such a manner that a suitable locking angle is maintained. Under any severe condition of impact, the contact of Pawls 3 with the Cam 4 plays a key role to keep seat structure intact and ultimately the occupant safe. As can be seen in FIG. 1, each of the four lobes of the Cam 4 is provided with a circular hole and each lobe is provided to be in contact with the fourth side surface of the pawls 3. Further, a shaft 5 having two steps is provided which provides a central axis to the assembly and passes through the holes of the guide plate 2 and said pivotable plate 1. The smaller diameter end of the shaft 5 passes freely through the centre of a guide plate 2. On the first step 28 i.e. on a smaller diameter of the shaft 5, the cam 4 is press fitted and on the second step 30 i.e. on the bigger diameter of the shaft 5, a retractor plate 6 is mounted.

The retractor plate 6 mounted on the second step 30 of the shaft 5 is placed between the pivotable plate 1 and Cam 4. A nominal torque applied to the shaft 5 first overcomes the pretension of the spring 7 and then allows the retractor plate 6 to rotate. During this rotation, the retractor plate 6 pushes the Pawls 3 downwards. These Pawls 3 are guided smoothly along the guides 16 formed in the Guide plate 2 and get disengaged. Once the seat recliner assembly gets disengaged, the driver/passenger can push the back forward or rearward to get desired position. After a comfortable position is achieved, the assembly gets locked in the desired position by releasing the torque applied to the shaft 5.

Figure 2:
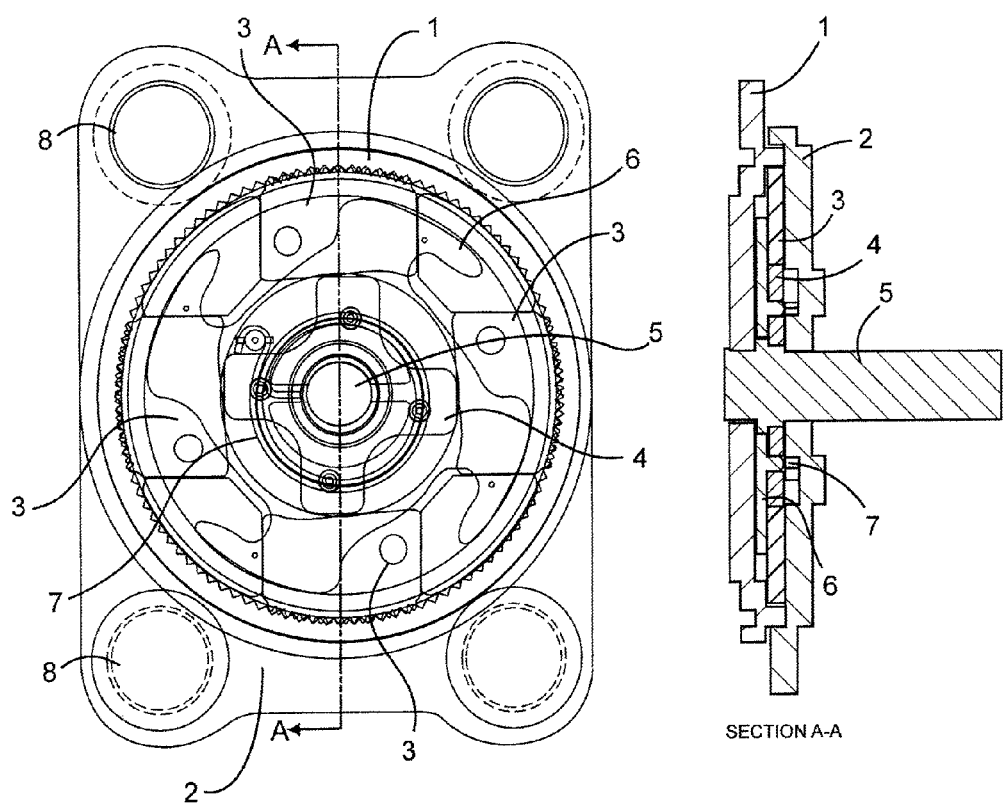
FIG. 2 illustrates depicts a perspective view of another embodiment of the assembly in a locked state and the cross sectional view of the assembly.

FIG. 2 illustrates depicts a perspective view of another embodiment of the assembly in a locked state and the cross sectional view of the assembly. As shown, the internal placement of various components of the assembly can be clearly seen in the figure. The cross sectional view taken along lines A-A of the assembly shows the interlocking of various components of the assembly.

Figure 3:
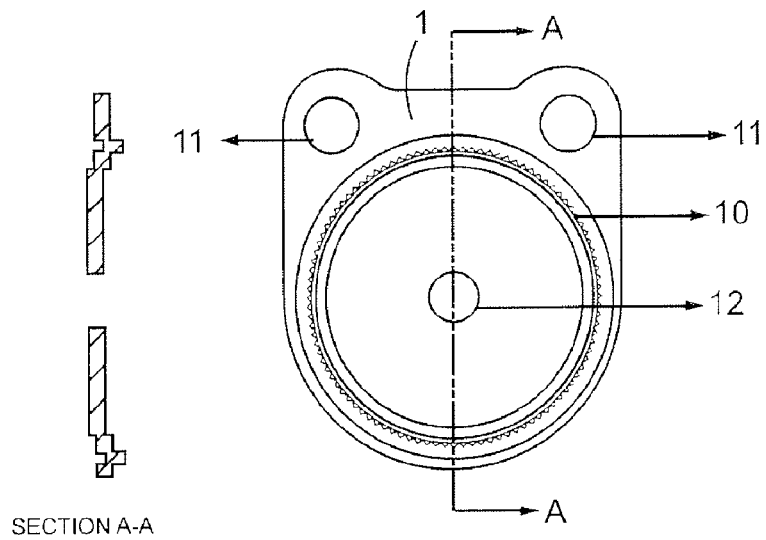
FIG. 3 depicts a Pivotable plate and cross sectional view of the same.

FIG. 3 shows the pivotable plate 1 which is an embossed plate with internal teeth. These teeth are V shaped and when engaged with Pawls 3, they act as a lock to disallow movement of the pivotable plate 1. This pivotable plate 1 is attached to the back frame of the seat with the help of rivets 8 through holes 11. The circular hole 12 provided on the pivotable plate 1 helps for angular movement in forward and rearward direction. When the Pivotable Plate 1 is in unlocked position, the assembly gets unlocked and the seat back is adjusted by the occupant to suit to his/her posture for comfort. Smooth movement of the recliner with fine increments is achieved using suitable tolerances on components. The cross sectional view taken along lines A-A is also shown in the figure. The pivotable plate 1 is also provided with a center hole 12 through which the shaft passes.

Figure 4:
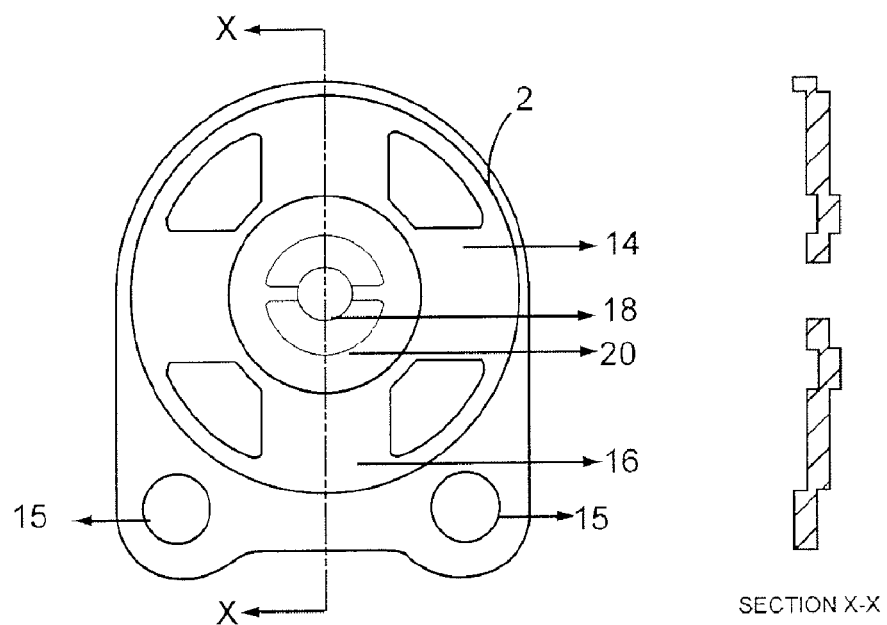
FIG. 4 depicts a Guide plate and cross sectional view of the same.

As shown in FIG. 4, the Guide plate 2 is attached to the frame of the cushion lower structure of the seat with the help of rivets 8 through holes 15. Guide plate 2 being fixed to the lower frame of the seat structure does not have any rotary movement. The Guide plate 2 has four guides 16 produced by the forming process. The height and width dimensions are very important to properly transfer the load to the guide plate 2 and ultimately to the vehicle base. The tolerances on dimensions are closely maintained in order to achieve smooth guide of pawls 3. The straightness of the guides 16 is maintained to achieve perfect locking of pawls 3 with pivotable plate 1. The guides 16 of guide plate 2 are designed in such a manner that during impact, full load is taken by guide plate 2. The cross sectional view taken along lines X-X is also shown in the figure. The guide plate 2 is also provided with a second circular hole 18 through which the shaft 5 passes. A first hook 20 on which the spring is hooked surrounds the hole 18.

Figure 5:
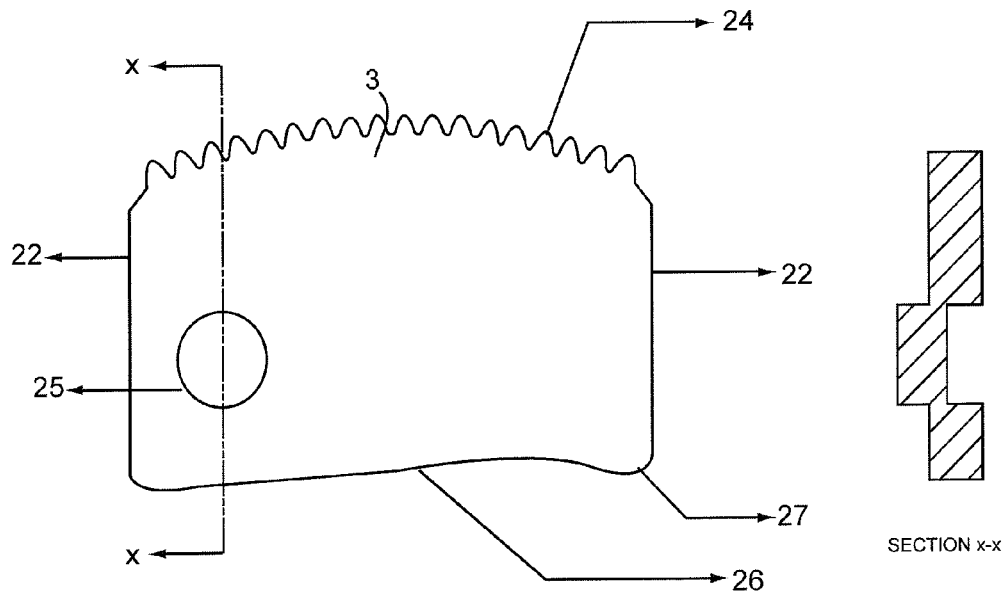
FIG. 5 depicts a Pawl and cross sectional view of the same.

As shown in FIG. 5, Pawls 3 have two guided side surfaces 22 and V-shaped teeth formed on the outer diameter of the third side surface 24. The fourth side surface 26 is opposite to the third side surface 24 and it has a tapered end 27. In the locking condition, four Pawls 3 and pivotable plate 1 get engaged with each other. The pawls 3, being four in number help to reduce the size of recliner assembly. Under conditions of impact, all the four pawls 3 share load and the full load has to get transferred to the guides of guide plate 2 through these pawls 3. The lower edge of each pawl 3 acts as a follower and is given a specific profile. When the cam 4 rides over the profile, the pawls 3 slide in the guides 16 made in the guide plate 2. At a certain angle of the movement of the cam 4, the pawls 3 get locked with pivotable plate 1 and in turn, lock the complete assembly. The recliner assembly gets released as soon as the Cam 4 is released with the help of a spring 7 when torque is applied. Each pawl 3 is further provided with a projection 25. The cross sectional view taken along lines X-X is also shown in the figure.

Figure 6:
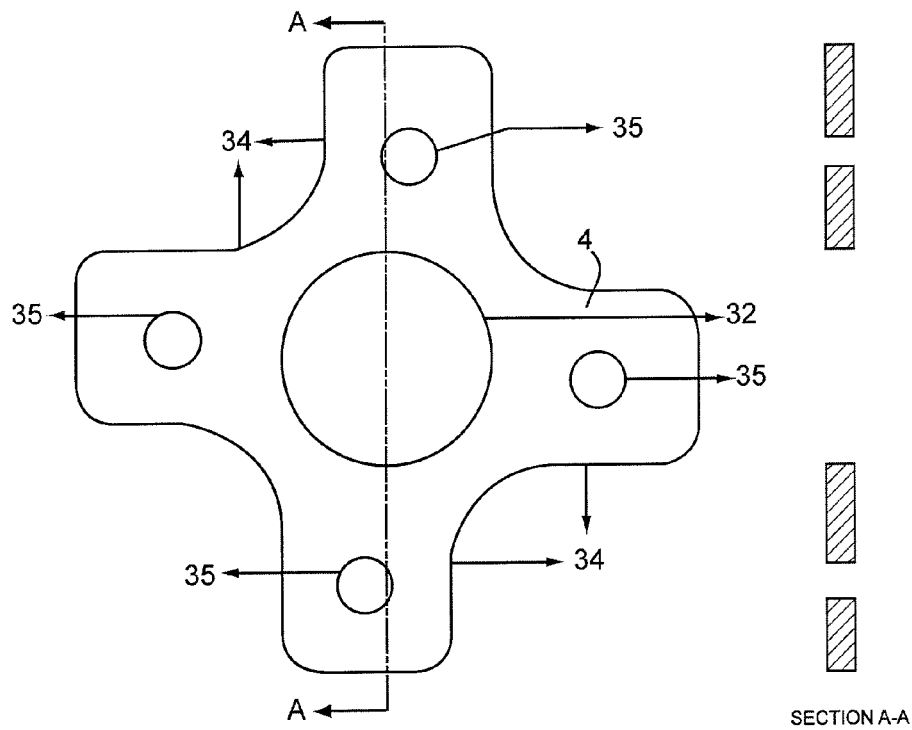
FIG. 6 depicts a Cam and cross sectional view of the same.

FIG. 6 shows Cam 4 with four lobes 34 used for engaging and disengaging with Pawls 3. The specific profile of Cam 4 pushes the pawls 3 upwards and downwards in the guide plate 2 to engage and disengage with pivotable plate 1 so that the seat back position can be adjusted when the pawls 3 disengage from the pivotable plate 1. A suitable friction angle is maintained between lobe of the cam 4 and the fourth side of the pawl 3 to achieve locking condition. With the help of this spring 7, Cam 4 can be released from its locking condition when torque is applied to the shaft. Each lobe is provided with a circular hole 35. The cross sectional view taken along lines A-A is also shown in the figure.

Figure 7:
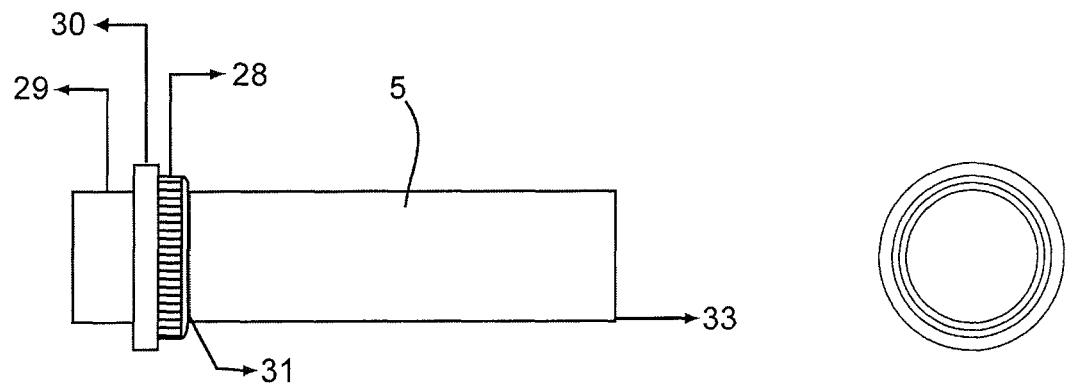
FIG. 7 depicts a shaft which is used to apply the torque to disengage the Pawls.

As shown in FIG. 7, the shaft 5 forms the central axis of the assembly and is used to apply torque to the Cam 4 for engaging and disengaging the assembly. The shaft 5 comprises of two steps: one larger than the other. On the first step 28 of the shaft, the cam 4 is press fitted on its diameter and on the second step 30 of the shaft 5, a retractor plate 6 is mounted. The pivotable plate 1 is mounted on the shaft portion 29 adjoining the second step 30 and the guide plate 2 is mounted on the shaft portion 31 adjoining the first step 28.

Figure 8:
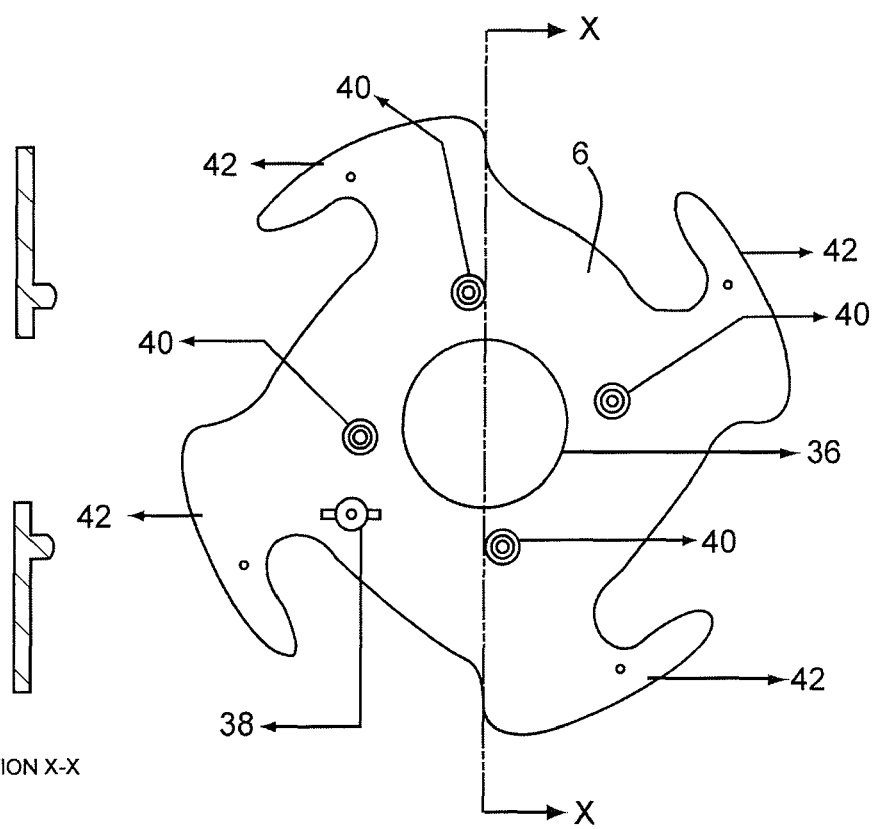
FIG. 8 depicts a retractor plate and cross sectional view of the same.

FIG. 8 shows the Retractor plate 6 which is secured with the Cam 4 with the help of projections 40 which fix in the holes 35 of the lobes 34. The plate 6 comprises a circular hole 36 at its center and a second hook 38 with the help of which the spring 7 is attached to it. This plate 6 has four arms 42 capable of engaging with the projections 25 of each of the said pawls 3 and pulling down the pawls 3 towards the center of the pivotable plate 1 to unlock the assembly and allow movement of the seat. The cross sectional view taken along lines X-X is also shown in the figure.

Figure 9:
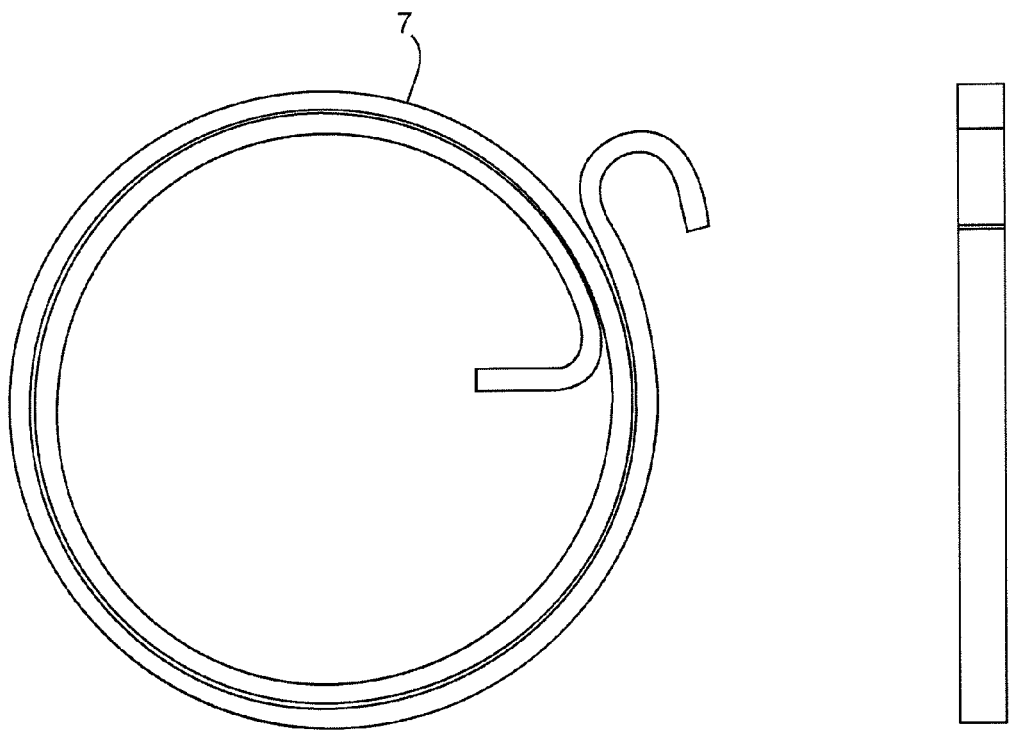
FIG. 9 depicts a spring.

As shown in FIG. 9, Spring 7 has two ends for hooking one end on the retractor plate 6 and the other end on the Guide plate 2. In the initial stage, the spring 7 is pre-tensioned to keep all the four Pawls 3 in position while the assembly is under locked condition. The pre-tensioned spring 7 is secured to the first hook 20 of the guide plate 2 and the second hook 38 of the retractor plate 6.

Figure 10:
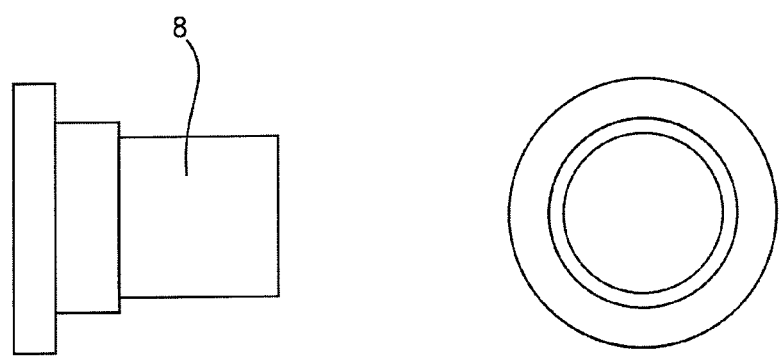
FIG. 10 depicts a rivet.

The four rivets 8 as shown in FIG. 10 hold the Pivotable plate 1 and Guide plate 2 together and fix the Guide plate 2 and Pivotable plate 1 to the seat structure.

In an embodiment, a lever is attached to one end 33 of the shaft 5 for applying torque to the shaft. This nominal torque to the shaft 5 first overcomes the pretension of the spring 7 and then makes the cam 4 rotate towards the tapered end of the pawls 3 to release pressure from the pawls 3, the pawls 3 thereby slide down towards the center axis of said assembly along the guides 16, the retractor plate 6 rotates and the arms of said retractor plate 6 engage with the projections of said pawls 3 to further pull down the pawls towards the center axis of said assembly and disengage the pawls from the first plate 1. When the pawls 3 are disengaged, the user may freely adjust the seat back. When the user releases the lever, the cam 4 and retractor plate 6 rotate back to their original position to again achieve the engagement of the pawls 3 with the pivotable plate 1 thereby locking the assembly and preventing any movement of the seat.

In another embodiment, a seat is provided with a pair of seat recliner assemblies which are secured to both sides of the seat and joined by a torsion rod. In such embodiment, when torque is applied to the shaft, the same passes through the torsion rod to the shaft of the second assembly on the other side of the seat, thereby making both engage and disengage at the same time to allow or prevent seat movement.

Figure 11:
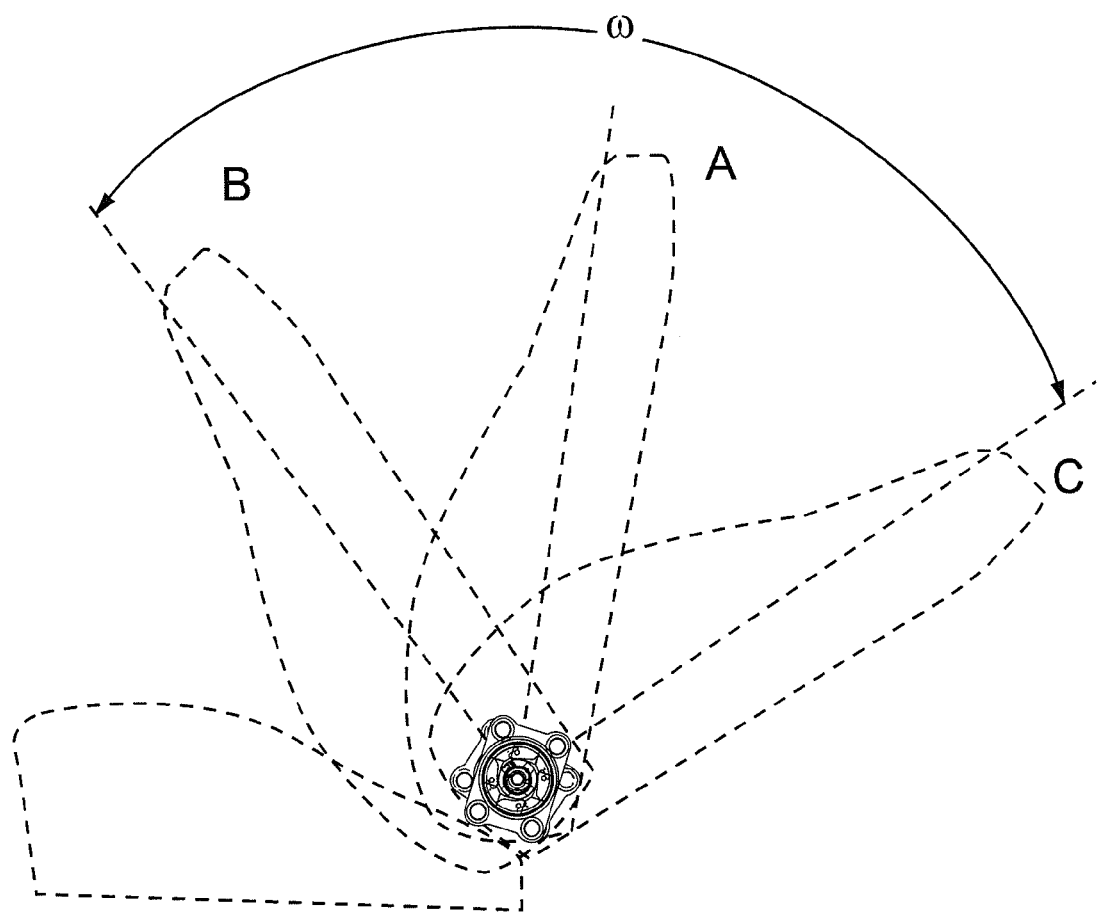
FIG. 11 shows different positions of the seat.

FIG. 11 shows different positions in which the seat can be adjusted by the assembly in the seat structure. Position A of the seat is considered as the desired position by the driver/passenger. In this position, the Pivotable plate 1 is fixed to the seat back structure and is in the locked condition. The spring 7 is given pretension so that it can hold Pawls 3 which are in contact with the pivotable plate 1. The Cam 4 locks the Pawls 3 with a desired pressure angle. Thus the seat back structure gets locked and does not move from the desired position A. The shaft 5 is integrated with the Cam 4 around the centre axis of the seat recliner assembly. To move the seat structure forward to position B, an optimum torque is applied to the shaft 5. By applying nominal torque to the shaft 5, the Cam 4 also rotates till it is relieved from holding the Pawls 3. At the same time, the spring 7 gets activated and the Pawls 3 are free to slide along the guide in the Guide plate 2.

In case, the pawls 3 are not pulled down appropriately, the retractor plate 6 helps the Pawls 3 to slide down till they get fully disengaged from the pivotable plate 1. Once Pawls 3 are disengaged from the Pivotable plate, a driver/passenger can move the seat back to position B in forward direction. In a similar way, the seat can be brought to position C in rearward direction. These are minimum angle and maximum angle positions of the seat and in between, the seat positions are adjusted in a similar fashion.

FIG. 12 illustrates just release position when pawls are about to drop due to its own weight.

FIG. 13 illustrates just release position when pawls do not drop due to its own weight.

FIG. 14 illustrates release position when pawls are pulled down by retractor plate.

Figure 15:
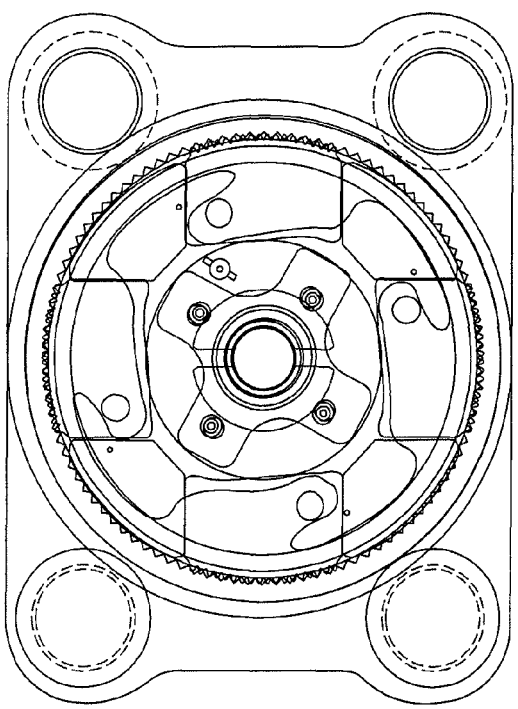
FIG. 15 illustrates release position when pawls are fully dropped due to its own weight.

FIG. 15 illustrates release position when pawls are fully dropped due to its own weight.

Figure 16:
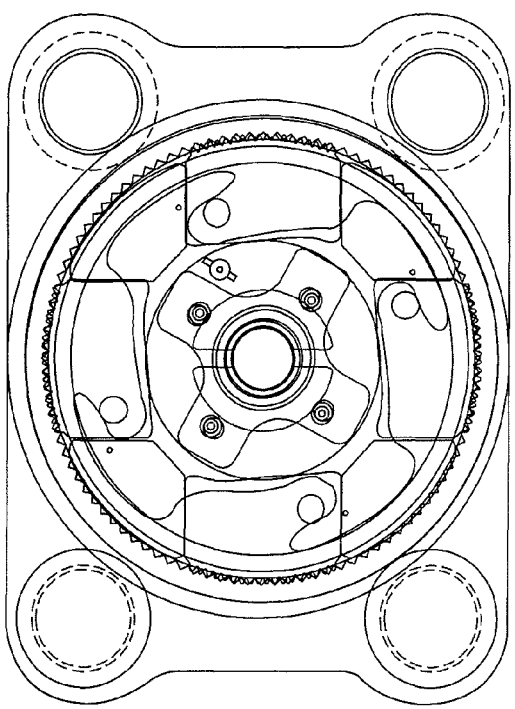
FIG. 16 illustrates release position when pawls are fully pulled by retractor plate.

FIG. 16 illustrates release position when pawls are fully pulled by retractor plate.

We claim:
1. A seat recliner assembly comprising:
   an embossed pivotable plate (1) placed on one end of the assembly and fixed to a back frame of a seat, said pivotable plate comprising:
      a first circular section (10) having a circumference with v-shaped teeth, and
      a first circular hole (12) at center of said circular portion;
   an embossed guide plate (2) placed on other end of the assembly and fixed to a lower frame of the seat, said guide plate comprising:
      a second circular section (14) having four guides (16),
      a second circular hole (18) at center of said circular portion (14), and
      a first hook (20) surrounding said hole;
   four pawls (3) secured to said guide plate by sliding in said four guides (16), each pawl comprising:
      two side surfaces (22) for sliding in said guides, a third side surface (24) with v-shaped teeth for engaging with said first circular section (10) when the seat is in a locked position, a fourth side surface (26) opposite to the third side surface (24) having a tapered end (27), and a projection (25);

a shaft (5) passing through the holes (18, 12) of said guide plate (2) and said pivotable plate (1) to provide a center axis to the assembly, comprising:

a first step (28), a second step (30) adjoining the first step (28), wherein the pivotable plate (1) is mounted on the shaft at a position (29) adjoining the second step (30) and the guide plate (2) is mounted on the shaft at a position (31) adjoining the first step (28);

a cam (4) fitted on said first step (28), said cam (4) comprising:

a circular hole (32) at its center, and four lobes (34), each provided with a circular hole (35) and each being in contact with the fourth side surface (26) of each pawl (3) to push the pawl (3) for engaging with said first circular section (10) when the seat is in a locked position;

a retractor plate (6) mounted on said second step (30), comprising:

a circular hole (36) at its center, a second hook (38), four projections (40) for fixing in said holes (35) of said lobes (34) and securing the plate (6) with the cam (4), four arms (42) capable of engaging with the projection (25) of each of said pawls (3) and pulling the pawls (3) towards the center of the pivotable plate (1) to disengage them from the said first circular portion (10); and a pre-tensioned spring (7) secured to said first hook (20) and said second hook (38);

wherein by applying torque to the shaft (5), the cam (4) rotates towards the tapered end of the pawls (3) to release pressure from the pawls, the pawls thereby slide down towards the center axis of said assembly along the guides (16), the retractor plate (6) rotates and the arms of said retractor plate (6) engage with the projections of said pawls (3) to further pull down the pawls towards the center axis of said assembly and disengage the pawls from the pivotable plate (1), thereby allowing movement of the seat.

2. The seat recliner assembly as claimed in claim 1, wherein a suitable angle is maintained between the fourth side surface of each of said pawls and each lobe of the cam to allow a tight engagement between the fourth side surface and the lobe.

3. The seat recliner assembly as claimed in claim 1, wherein the pivotable plate (1) and the guide plate (2) are fixed to said back frame and said lower frame respectively with rivets (8).

4. The seat recliner assembly as claimed in claim 1, comprising a lever attached to one end (33) of the shaft for applying torque to the shaft.

5. A seat comprising a pair of said seat recliner assemblies claimed in claim 1, secured on both sides of the seat and joined by a torsion rod.

* * * * *